United States Patent
Jiang et al.

(10) Patent No.: US 12,123,255 B2
(45) Date of Patent: Oct. 22, 2024

(54) DUAL-MODE SMART SWITCHABLE LIQUID CRYSTAL WINDOW

(71) Applicant: KENT STATE UNIVERSITY, Kent, OH (US)

(72) Inventors: Yingfei Jiang, Kent, OH (US); Deng-Ke Yang, Kent, OH (US); Yunho Shin, Kent, OH (US)

(73) Assignee: KENT STATE UNIVERSITY, Kent, OH (US)

( * ) Notice: Subject to any disclaimer, the term of this patent is extended or adjusted under 35 U.S.C. 154(b) by 0 days.

(21) Appl. No.: 18/034,714

(22) PCT Filed: Nov. 1, 2021

(86) PCT No.: PCT/US2021/072144
§ 371 (c)(1),
(2) Date: May 1, 2023

(87) PCT Pub. No.: WO2022/094618
PCT Pub. Date: May 5, 2022

(65) Prior Publication Data
US 2023/0399889 A1     Dec. 14, 2023

Related U.S. Application Data

(60) Provisional application No. 63/198,618, filed on Oct. 30, 2020.

(51) Int. Cl.
*G02F 1/137* (2006.01)
*E06B 9/24* (2006.01)

(52) U.S. Cl.
CPC ............ *E06B 9/24* (2013.01); *G02F 1/13712* (2021.01); *G02F 1/13737* (2013.01); *E06B 2009/2464* (2013.01); *G02F 2202/043* (2013.01)

(58) Field of Classification Search
CPC .............. E06B 9/24; E06B 2009/2464; G02F 1/13712; G02F 1/13737
See application file for complete search history.

(56) References Cited

U.S. PATENT DOCUMENTS 7,053,975 B2   5/2006  Wood et al.
8,913,215 B2   12/2014 Yang et al.
(Continued)

OTHER PUBLICATIONS

CN 1359479 A (Li, Lie et al.) translation (Year: 2002).*
(Continued)

*Primary Examiner* — James A Dudek
(74) *Attorney, Agent, or Firm* — Lippes Mathias LLP

(57) ABSTRACT

A dual-mode switchable liquid-crystal window can control both radiant energy flow and privacy. The modes are selected by using different voltage frequencies. A dichroic dye is doped to enable modulation of transmission of the window. In the absence of an applied voltage, the window is transparent without haze. When a high-frequency (e.g., 1 kHz) voltage is applied, the liquid crystal and doped dye molecules inside the window reorient uniformly under dielectric interactions. The material becomes optically absorbing. The transmittance decreases, but the haze does not change. In this mode, the window can control radiant energy flow through the window. When a low-frequency (50 Hz) voltage is applied, the liquid crystal and doped dye molecules are switched into a micron-sized polydomain structure under flexoelectric interactions. The material becomes optically scattering and absorbing. The scenery behind the window is blocked. In this mode, privacy can be controlled. This dual-mode switchable window is suitable for architectural and automobile windows.

20 Claims, 8 Drawing Sheets

(56) References Cited

U.S. PATENT DOCUMENTS

| | | | |
|---|---|---|---|
| 9,690,161 B2 | 6/2017 | Lavrentovich et al. | |
| 2009/0279033 A1* | 11/2009 | Yoneya | G02F 1/1391 |
| | | | 349/170 |
| 2017/0212390 A1* | 7/2017 | Miyake | G02F 1/133711 |

OTHER PUBLICATIONS

Jiang et al "Dual-Mode Switchable Liquid Crystal Window" Phys. Rev. Applied 12,054037,2019 Retrieved from the Internet. <URL: https://sci-hubtw.hkvisa.net/10.1103/PhysRevApplied.12.054037> entire document.
PCT ISR (PCT/US2021/072144) dated Jan. 31, 2022 (2 pgs).
PCT WR OPN (PCT/US2021/072144) dated Jan. 31, 2022 (6 pgs).

\* cited by examiner

DUAL-MODE SMART SWITCHABLE LIQUID CRYSTAL WINDOW

This application is a National Stage Entry of International Application No. PCT/US2021/072144, filed Nov. 1, 2021, which claims priority to U.S. Prov. App. No. 63/198,618, filed Oct. 30, 2020, the contents of both of which are incorporated by reference herein in their entireties.

This application claims the priority benefit of U.S. Provisional Application Ser. No. 63/198,618, filed Oct. 30, 2020, the contents of which are incorporated by reference herein.

BACKGROUND

The present disclosure relates to dual-mode smart switchable liquid crystal windows as well as devices containing the windows and methods for making and using the windows.

Switchable smart windows (or glass) are important due to their applications in architecture, vehicles, eyeglasses, and various types of displays. The functions of smart windows include radiant energy-flow control, privacy protection, and aesthetics. For radiant energy-flow control (visible- and near-infrared-light wavelength regions) applications, in one state, the window is transparent and allows radiant energy to flow through it; in another state, the window is absorbing (or reflecting) and reduces the radiant energy flow, but the scenery behind can be seen (the image is not distorted). By reducing radiant energy flow through windows, buildings and cars can be kept cooler on hot summer days. In privacy control (visible-light wavelength region) applications, in one state, the window is transparent and the scenery behind the window can be seen; in another state, the window is opaque (or frosted) and the scenery behind cannot be seen (the image is completely distorted), but radiant energy may still flow through. Notably, in radiant energy-flow control mode, if the transmittance is low enough, the window becomes black, and then it can also control privacy.

Depending on the active materials used, currently, smart window technologies can be categorized into three types: suspended particles, electrochromics, and liquid crystals. Both suspended particle and electrochromic smart windows can only control radiant energy flow. Meanwhile, switching is slow, the contrast ratio may not be high, and the optical performance may be dependent on wavelength.

In the last couple decades, liquid crystals have been intensively studied for switchable smart windows. The competing technologies are polymer-dispersed liquid crystals (PDLCs), polymer-stabilized cholesteric textures (PSCTs), cholesteric liquid crystals, and dichroic dye-based guest-host liquid crystals. In a PDLC, nematic liquid crystal droplets are dispersed in an isotropic polymer. When no voltage is applied, the orientation of the liquid crystal droplets is random and the effective refractive index of the liquid crystal droplets is not matched to that of the polymer; the material is scattering. When a voltage is applied, the liquid crystal droplets are aligned unidirectionally and the effective refractive index of the liquid crystal droplets matches that of the polymer; the material becomes transparent. In a PSCT, a small amount of polymer network is dispersed in a cholesteric liquid crystal. When no voltage is applied, the liquid crystal is in a polydomain structure; the effective refractive index changes from one domain to another and the material is scattering. When a voltage is applied, the liquid crystal is unidirectionally aligned and forms a single domain, so the material becomes transparent. PDLCs and PSCTs can control privacy. A cholesteric liquid crystal possesses a periodic helical structure. When no voltage is applied, the liquid crystal selectively reflects light in the wavelength region from $\lambda_1 = n_o P$ to $\lambda_2 = n_e P$, where P is the helical pitch of the liquid crystal and $n_o$ and $n_e$ are ordinary and extraordinary refractive indices, respectively, of the liquid crystal. When a sufficiently high voltage is applied, the helical structure is unwound and the material becomes transparent. For most cholesteric LCs, the reflection bandwidth is about 50 nm.

To cover the visible- and near-infrared-light wavelength regions, a gradient of the helical pitch is required; this can be achieved by using polymer stabilization. Therefore, cholesteric liquid crystals can control radiant energy flow in visible- and near-infrared wavelength regions. Guest-host liquid crystals contain dichroic absorbing dyes, which are also elongated molecules. When no voltage is applied, the liquid crystal and dye are parallel to the cell substrate, and thus, are parallel to the polarization of incident light; the materials are optically absorbing. When a voltage is applied, the LC and dye are aligned perpendicular to the cell substrate, and thus, perpendicular to the polarization of incident light; the material is transparent. For most dichroic dyes, the absorbing band can only cover the visible-light wavelength region. Therefore, they can also control radiant energy flow in this region. For all technologies mentioned above, the materials can be switched from one state to the other state by applying voltages. They all suffer from the drawback that they have only one function: either radiant energy-flow control or privacy control.

There is a need for dual-mode smart windows.

BRIEF DESCRIPTION

The present disclosure relates to a dual-mode smart switchable liquid crystal window that can control both radiant energy-flow and privacy. The switchable liquid crystal window makes use of dielectric and flexoelectric effects. In the absence of an applied voltage, the window is clear and transparent, and radiant energy can flow through it and the scenery behind the window can be seen. When a low frequency, for example, 50 Hz, voltage is applied, the window is switched to an optical scattering and absorbing state by a flexoelectric effect, and thus privacy is protected. When a high frequency, for example, 1 kHz, voltage is applied, the window is switched to an optical absorbing but non-scattering state by a dielectric effect, and thus radiant energy-flow is controlled.

Disclosed, in some embodiments, is a dual-mode switchable liquid crystal window. The window includes a liquid crystal composition between a first transparent electrode and a second transparent electrode. The liquid crystal composition contains a liquid crystal mixture and a dichroic dye and has a slightly negative dielectric anisotropy and a large flexoelectric coefficient.

The amount of the dichroic dye may be less than 5 wt %, including less than 3 wt % and less than 2 wt %.

In some embodiments, the amount of the dichroic dye is about 1 wt % to about 2 wt %.

The liquid crystal mixture may contain at least one nematic liquid crystal and at least one liquid crystal dimer.

In some embodiments, the window is transparent without haze in the absence of an applied voltage.

The liquid crystal and doped dye molecules inside the window may reorient uniformly under dielectric interactions when a high-frequency voltage is applied.

In some embodiments, the liquid crystal and doped dye molecules are switched into a micron-sized polydomain structure under flexoelectric interactions when a low-frequency voltage is applied.

Disclosed, in other embodiments, is a dual-mode switchable liquid crystal window including a liquid crystal composition between a first transparent electrode and a second transparent electrode. The window is transparent with little haze in the absence of an applied voltage. The liquid crystal and doped dye molecules inside the window reorient uniformly under dielectric interactions when a high-frequency voltage is applied. The liquid crystal and doped dye molecules are switched into a micron-sized polydomain structure under flexoelectric interactions when a low-frequency voltage is applied.

Disclosed, in further embodiments, is a method for switching a window. The method includes providing a liquid crystal cell comprising a liquid crystal composition disposed between a first transparent electrode and a second transparent electrode, wherein the window is transparent without haze in the absence of an applied voltage; and applying one of: a high-frequency voltage, wherein liquid crystal molecules and doped dye molecules inside the window reorient uniformly under dielectric interactions; and a low-frequency voltage, wherein liquid crystal molecules and doped dye molecules are switched into a micron-sized polydomain structure under flexoelectric interactions.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
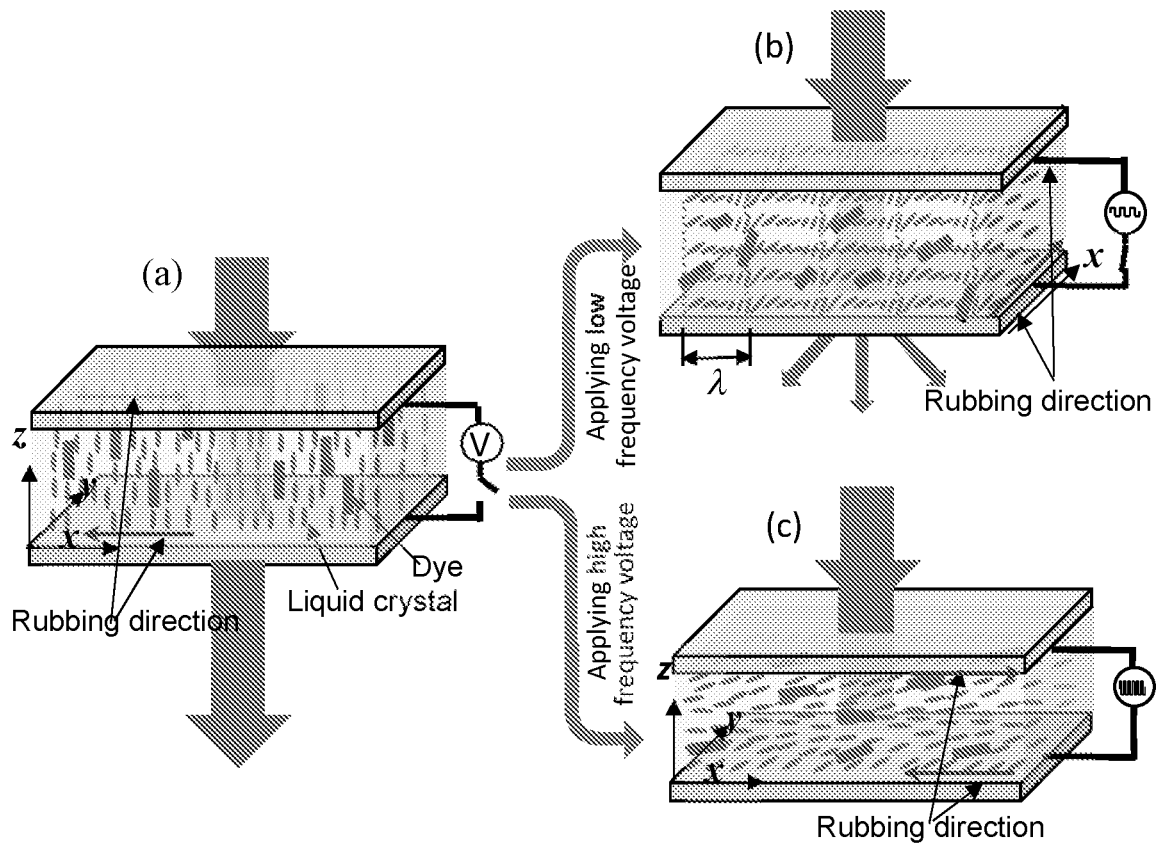
FIG. 1 is a schematic diagram of a dual mode smart window in accordance with some embodiments of the present disclosure.

The present disclosure may be understood more readily by reference to the following detailed description of desired embodiments included therein. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The present disclosure relates to a smart switchable window that can be operated in two independent modes to control energy flow and privacy. Existing switchable windows can only control privacy or radiant energy flow. The switchable windows of the present disclosure can control both privacy and radiant energy flow. In the absence of applied voltage, the window is optically transparent. When a low frequency voltage is applied, the window becomes scattering and control privacy. When a high frequency voltage is applied, it becomes absorbing and control radiant energy flow.

In the smart window, when no voltage is applied, the liquid crystal material is in a uniform state and is transparent, and radiant energy can flow through, so that scenery behind the liquid crystal window can be seen. When a low-frequency voltage is applied, the liquid crystal is switched to a polydomain state under the influence of the flexoelectric effect. The liquid crystal window strongly scatters and weakly absorbs light. When a high-frequency voltage is applied, the liquid crystal is switched to a uniform absorbing state under the influence of the dielectric effect. The liquid crystal absorbs, but does not scatter, light.

FIG. 1 is a schematic diagram of a dual mode smart window in accordance with some embodiments of the present disclosure. In the liquid crystal window, the liquid crystal has a small negative dielectric anisotropy ($\Delta\varepsilon<0$) and a large flexoelectric coefficient. It is also doped with a small amount of a black dichroic dye. The mixture is filled into a cell with a homeotropic alignment. In the absence of an applied voltage, the liquid crystal is in the homeotropic state, as shown in FIG. 1(a), where the orientation of the liquid crystal is uniform and the material does not scatter light. Furthermore, the doped dye molecules are also in the homeotropic state and little absorption is exhibited. Without wishing to be bound by theory, it is believed that the weak absorption is caused by the imperfect orientational ordering of the dye molecules due to thermal motion. Therefore, the material is transparent. When a voltage is applied across the cell, the liquid crystal may reorient. The response of the liquid crystal depends on the frequency and amplitude of the applied voltage. Because the liquid crystal has non-zero dielectric anisotropy and flexoelectric coefficient, there are both dielectric interaction and flexoelectric interaction. The dielectric interaction is insensitive to the polarity of the applied voltage, while the flexoelectric interaction is sensitive to the polarity of the applied voltage. When a low frequency AC voltage is applied, the flexoelectric interaction is dominant in determining the reorientation of the liquid crystal, because the dielectric anisotropy is small and the flexoelectric coefficient is large. When a high frequency AC voltage is applied, the flexoelectric interaction does not affect the reorientation of the liquid crystal, because of the limited response speed of the liquid crystal.

When a high frequency voltage is applied, only the dielectric interaction is important. The electric field generated by the applied voltage is in the cell surface normal direction (the z-direction). The liquid crystal tends to align orthogonal to the electric field because of its negative dielectric anisotropy. The liquid crystal is switched to the homogeneous state, as shown in FIG. 1(c), where the liquid crystal is parallel to the cell surface. The doped dye molecules become parallel to the cell substrate (in the x-direction), and will absorb the incident light with polarization in the x-direction. Therefore, the material becomes absorbing.

When a low frequency voltage is applied, the flexoelectric interaction is dominant, and the liquid crystal is switched to the striped state as shown in FIG. 1(b). The cell has a homeotropic alignment layer. There is no preferred direction for the stripes. Therefore, the stripes wiggle in the xy-plane. Furthermore, when the applied voltage changes polarity, the liquid crystal director flips. Thus, a poly-domain structure is formed, and the material becomes optically scattering.

The reorientation of the liquid crystal under a high-frequency voltage, where only the dielectric interaction is important, is considered. The electric field generated by the applied voltage is in the cell surface normal direction (the z-direction). The liquid crystal tends to align orthogonal to the electric field because of its negative dielectric anisotropy. When the liquid crystal reorients, its orientation will vary along the z-direction because of the alignment layer. The non-uniform liquid crystal orientation produces an elastic energy, which disfavors reorientation. To induce reorientation of the liquid crystal, the applied voltage must be high enough that the decrease in the dielectric energy can compensate for the increase in the elastic energy. This electric-field-induced reorientation is known as a Fréedericksz transition.

When a voltage higher than a threshold voltage ($V_{th}$) is applied, the LC is switched to the homogeneous state, as shown in FIG. 1(c), where the liquid crystal is parallel to the cell surface. The doped dye molecules become parallel to the cell substrate (in the x-direction) and will absorb incident light with polarization in the x-direction; therefore, the material becomes absorbing.

The reorientation of the liquid crystal under a low-frequency voltage is also considered. If the response time of the liquid crystal is r, the frequency should be lower than $\frac{1}{2}\tau$. When the applied voltage is lower than $V_{th}$, the liquid crystal orientation is uniform and there is only dielectric interaction. When the applied voltage is higher than $V_{th}$, the liquid crystal orientation becomes nonuniform. A spontaneous electric polarization is induced and the flexoelectric interaction arises. The liquid crystal is switched to the striped state, as shown in FIG. 1(b). The flexoelectric interaction is much stronger than the dielectric interaction. The dielectric interaction may be neglected because of the small dielectric anisotropy.

The cell has a homeotropic alignment layer. There is no preferred direction for the stripes. Therefore, the stripes wiggle in the xy-plane. Furthermore, when the applied voltage changes polarity, the liquid crystal director flips. Therefore, a polydomain structure is formed and the material becomes optically scattering.

Each transparent electrode may be associated with its own alignment layer.

Non-limiting examples of applications in which the windows of the present disclosure may be utilized include office windows, architectural windows, and automobile windows.

The following examples are provided to illustrate the devices and methods of the present disclosure. The examples are merely illustrative and are not intended to limit the disclosure to the materials, conditions, or process parameters set forth therein.

EXAMPLES

Figure 2:
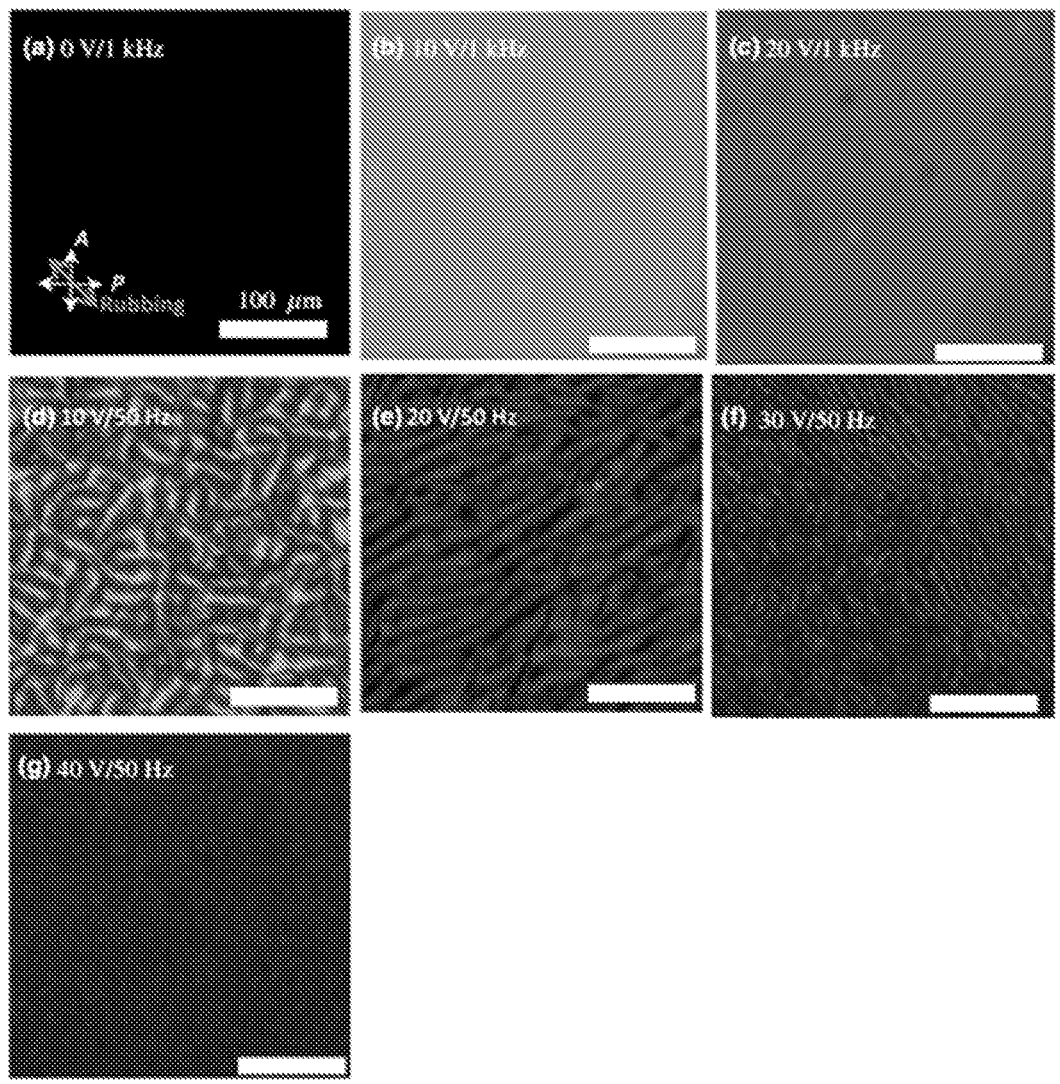
FIG. 2 includes optical microphotographs of a liquid cell with a homeotropic alignment layer under various voltages and frequencies where the scale bars are 100 μm.

FIG. 2 includes optical microphotographs of a liquid cell with a homeotropic alignment layer under various voltages and frequencies where the scale bars are 100 μm.

Figure 3:
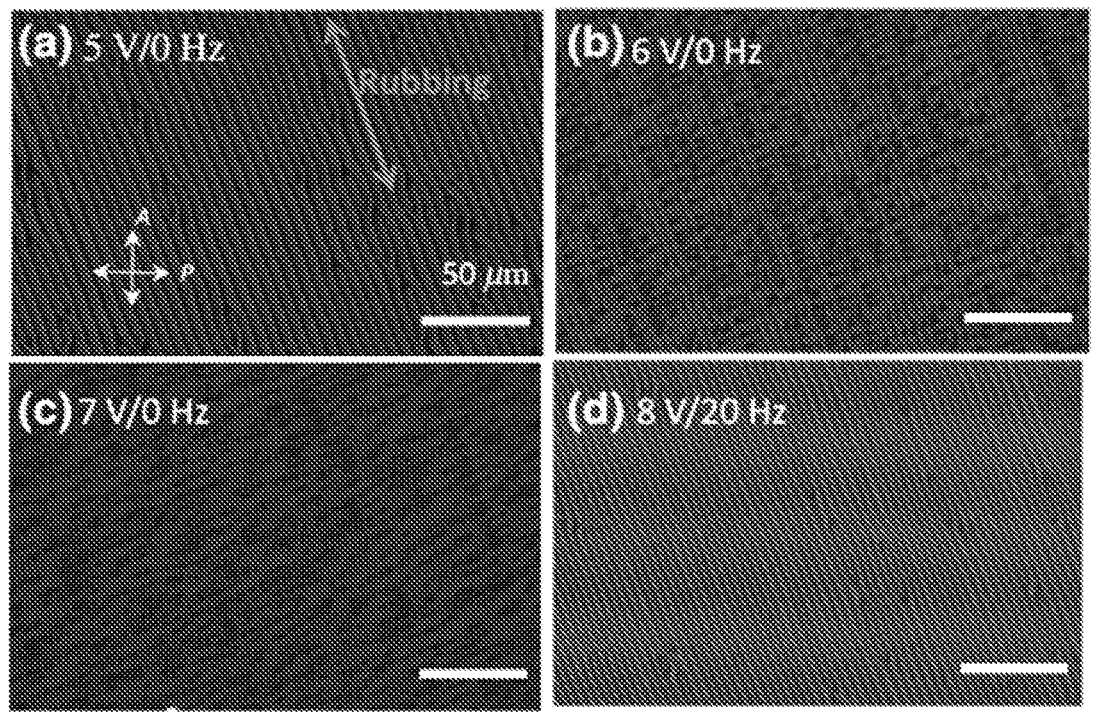
FIG. 3 contains optical micrographs of a liquid crystal cell with a homogeneous alignment layer under various voltages and frequencies where the scale bars are 50 μm.

FIG. 3 contains optical micrographs of a liquid crystal cell with a homogeneous alignment layer under various voltages and frequencies where the scale bars are 50 μm.

Figure 4:
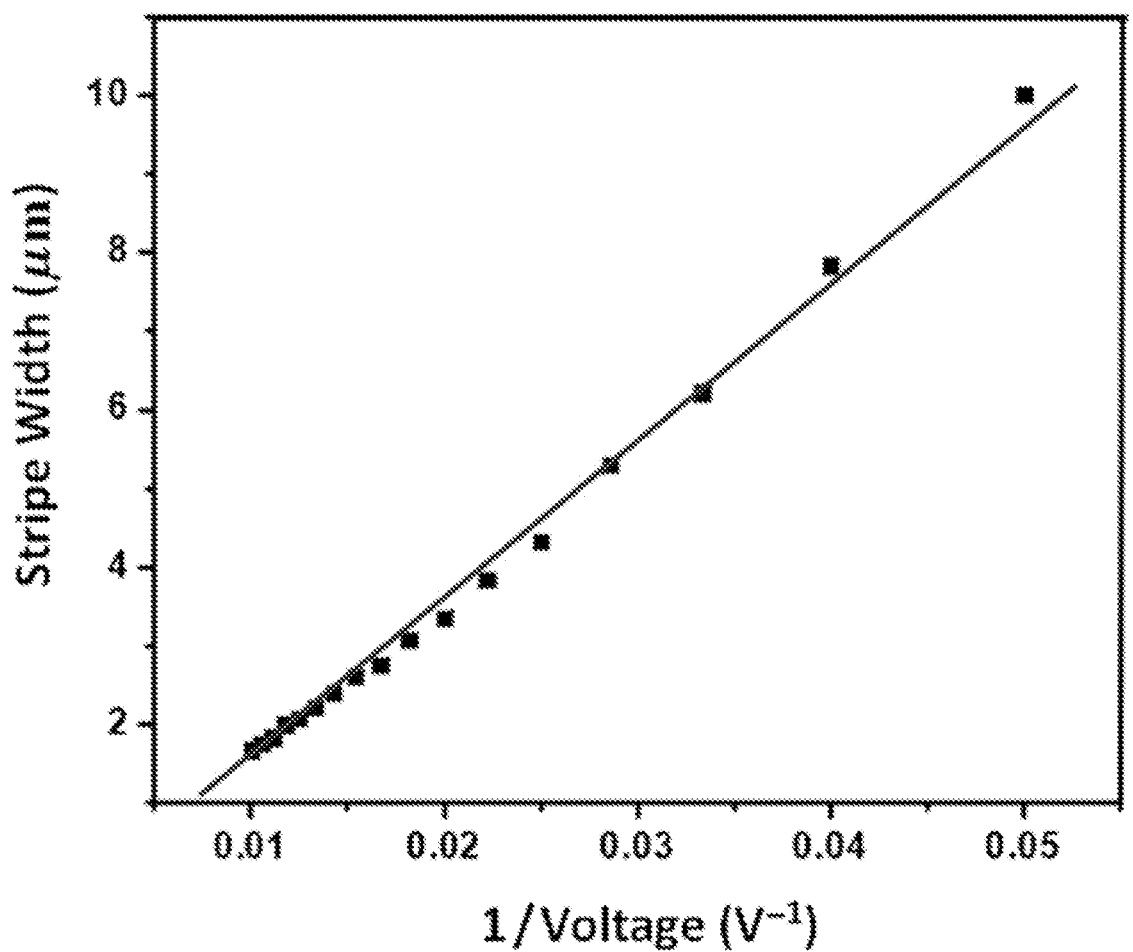
FIG. 4 is a graph showing stripe width versus inversion of the applied voltage where the frequency of the applied voltage is 0 Hz.

FIG. 4 is a graph showing stripe width versus inversion of the applied voltage where the frequency of the applied voltage is 0 Hz.

Example 1

The liquid crystal has the following properties: (1) a small negative dielectric anisotropy that can make the LC reorient to parallel to the cell substrate when a voltage is applied, but does not suppress the flexoelectric effect when a low frequency voltage is applied, (2) a large flexoelectric coefficient that can produce the flexoelectric stripe under a low voltage. A non-limiting example of a liquid crystal composition satisfying these properties includes 10.0 wt % nematic liquid crystal MAT978 (Merck), 64.0 wt % nematic liquid crystal ZLI4330 (Merck), 12.3 wt % liquid crystal dimer CB7CB (HCCH), 12.2 wt % liquid crystal dimer CB9CB (HCCH), and 1.5 wt % a black dichroic dye. The dielectric anisotropy of the mixture was −0.3. Under dielectric electric interaction, the liquid crystal tends to align perpendicular to externally applied electric fields. The dimers have bent molecular shapes and are known to exhibit large flexoelectric effect. The liquid crystal composition was filled into cells assembled by two parallel glass plates with indium-tin oxide (ITO) coating (electrode). The inner surfaces of the cells were coated with Polyimide SE1211 (Nissan Chemical) which generated a homeotropic alignment of the liquid crystal. The alignment layer was prebaked at 80° C. for 30 seconds, followed by a hard bake process at 180° C. for 1 hour. It was also mechanically rubbed to generate a small (less than 1°) pretilt angle. The small pretilt angle can guide the initial rotation of the LC but cannot control the direction of the flexoelectric stripe. The cell gap was controlled by 10 μm glass fibers.

In some embodiments, the dielectric anisotropy of the liquid crystal composition is in the range of about −5 to about −0.1.

The magnitude of the flexoelectric coefficient may be in the range of about 1 to about 50 pC/m. It should be noted that the coefficient can be positive or negative.

In some embodiments, the concentration of the dichroic dye in the composition is in the range of about 0.1 wt % to about 5 wt %.

The low frequency voltage may have a frequency in the range of from greater than 0 to about 500 Hz, including from 1 to about 500 Hz.

In some embodiments, the high frequency voltage has a frequency in the range of from about 500 to about 10,000 Hz.

The response of the material to applied voltages was studied under a polarizing optical microscope with crossed polarizers (FIG. 2). In the absence of an applied voltage, the liquid crystal is in the homeotropic state. The texture of the cell in the dark is shown in FIG. 2(a). When an AC voltage with a frequency of 1 kHz is applied, only the dielectric interaction plays a role in reorientation of the liquid crystal. The splay elastic constant, Kit, of ZL14330 is 10 pN. The elastic constant of the mixture was not measured. As an approximation, the elastic constant of ZLI4330 was used. Using Eq. (4), the threshold voltage, $V_{th}$, is calculated to be 6.1 V. Experimentally, it was found that the threshold voltage is 6.5 V. When the applied voltage is below 6.5 V, the state of the liquid crystal remains unchanged. When the applied voltage is increased above the threshold, the liquid crystal starts to tilt toward the direction parallel to the cell substrate. The liquid crystal exhibits optical retardation and rotates the polarization of the incident light, so the cell becomes brighter. The texture of the cell under 10 and 20 V is shown in FIGS. 2(b) and 2(c), respectively. The texture is uniform and there is no light scattering. When an AC voltage with a frequency of 50 Hz is applied, the flexoelectric interaction dominates in reorienting the liquid crystal. When 10 V is applied, the liquid crystal is switched to the striped state, as shown in FIG. 2(d). The directions of the stripes are random and there is light scattering. When the applied voltage is increased, the width of the stripe decreases, as shown in FIGS. 2(e)-2(g), and the scattering becomes stronger.

It is known that electroconvection can also induce a periodic striped structure (Williams domain) in liquid crystals with negative anisotropies, high ion density, and positive conductivity anisotropy. The dimers used in the Examples are highly purified. The resistivity of the liquid crystal composition used in the Examples was measured at a value of $3 \times 10^8$ Ω·m under a voltage of 1 V/1 kHz. The resistivity is high and it is unlikely to exhibit the electroconvection effect. Furthermore, in cells with homogeneous boundary conditions, the stripes induced through the electroconvection effect are usually perpendicular to the surface alignment direction; on the contrary, the stripe induced by flexoelectric effect is parallel to the alignment direction. To check whether the observed striped structure is induced by the flexoelectric effect or electroconvection effect, a liquid crystal composition containing of 9.3 wt % nematic liquid crystal, MAT978 (Merck); 60.7 wt % nematic liquid crystal, ZLI4330; 15.0 wt % liquid-crystal dimer, CB7CB; and 15.0 wt liquid-crystal dimer, CB9CB was prepared. This liquid crystal is filled in a cell with inner surfaces coated by the alignment material PI2170 (Nissan Chemicals), which is baked and rubbed for homogeneous alignment of the liquid crystals. The cell thickness is controlled by two-micron spacers. Voltages of various amplitudes and frequencies are applied to the cell to study the striped structure. The cell is studied under a polarizing optical microscope and the results are shown in FIG. 3. When no voltage is applied, the liquid crystal is in the homogeneous state. When the applied voltage is 5 V/0 Hz, the liquid crystal is switched to the striped state with the texture shown in FIG. 3(a). The stripes are in the same direction, parallel to the alignment layer rubbing direction, throughout the cell. When the applied voltage is increased, the periodicity decreases, but the direction of the stripes remains parallel to the alignment-layer rubbing direction, as shown in FIGS. 3(b) and 3(c). When the applied voltage is 8 V/20 Hz, the striped structure is also observed, as shown in FIG. 3(d). When the frequency of the applied voltage is increased to 50 Hz, the directions of the stripes become more or less random. This result, that the stripe is parallel to the alignment direction under an applied voltage with low frequencies, indicates that the striped state in the cell is induced by the flexoelectric effect.

The scattering effect of the liquid crystal in the striped structure depends on the liquid crystal domain size, which is about the same as that of the width of the flexoelectric stripe. As shown by Eq. (11), the width of the stripe is controlled by the applied voltage. The stripe widths were measured at various applied voltages (FIG. 4). The width decreases with increasing applied voltage. The width versus the inversion of the applied voltage is approximately linear, which agrees well with the prediction by Eq. (11).

Figure 5:
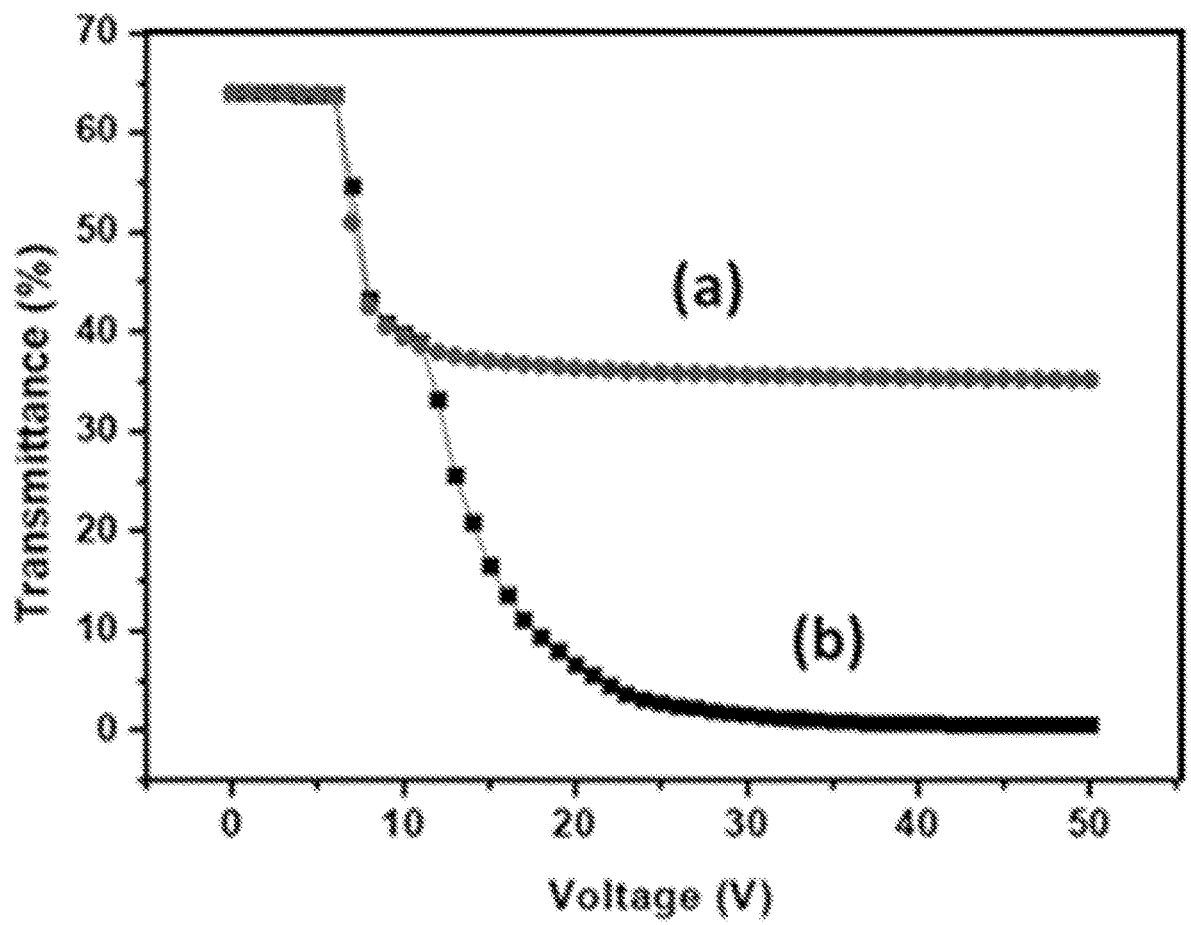
FIG. 5 is a graph showing transmittance of the cell as a function of applied voltage with light wavelength of 542 nm and two different frequencies: (a) 1 kHz and (b) 50 Hz.

The electro-optical response of the liquid crystal was measured. In the measurement, a He—Ne green laser with wavelength of 542 nm was used. The light was unpolarized and was normally incident on the liquid crystal cell. The detector was a photo-diode with the collection angle of 4°. When the frequency of the applied voltage was 1 kHz, the result is shown by curve (a) in FIG. 5. Under this frequency there was only dielectric effect, but no flexoelectric effect. There was no light scattering. The change of the transmittance was due to the change of the absorption of the doped dye molecules. When the applied voltage was 0, the LC was in the homeotropic state and the transmittance was 65%. The light loss was caused by the residual absorption of the dye, because the dye molecules were not exactly aligned along the cell normal direction due to thermal motion. When the applied voltage was increased above 6.5 V (the threshold voltage), the LC started to tilt away from the cell normal and material became more absorbing. Therefore, the transmittance began to decrease. When the applied voltage was increased to 20 V, the transmittance reached the minimum value of 36%. This minimum value was not very low, because when the liquid crystal molecules reoriented, they were on the xz-plane as shown in FIG. 1(c) and only absorbed the incident light with polarization in the x-direction. When the frequency of the applied voltage was 50 Hz, the result is shown by curve (b) in FIG. 5. For applied voltages below 10 V, the voltage dependence of the transmittance was the same as that when the frequency was 1 kHz, because the LC director configuration was uniform and there were no flexoelectric stripes. When the applied voltage was increased above 10 V, the flexoelectric stripes began to form and the material became scattering due to the flexoelectric interaction. The transmittance decreased more dramatically with the increasing applied voltage. When the applied voltage was increased to 35 V, the transmittance reached the minimum value of 0.5%. The low transmittance is due to some absorption caused by the dye molecules and the scattering caused by the flexoelectric domains. Most of the scattered light is still in forward direction.

Example 2

The same liquid crystal mixture as in Example 1 was used. It was filled into two cells which were made in the same way as described in Example 1. Two liquid crystal cells were stacked in such a way that their rubbing directions were orthogonal to each other. When a high frequency voltage was applied, in one cell, the liquid crystal reoriented to the x-direction and absorbed the liquid crystal polarized in the x-direction; in the other cell, the LC reoriented to the y-direction and absorbed the liquid crystal polarized in the y-direction. For an unpolarized incident light, it can be decomposed into two linearly polarized light in two orthogonal directions. Therefore, the two stacked cells can absorb unpolarized incident light.

Figure 6:
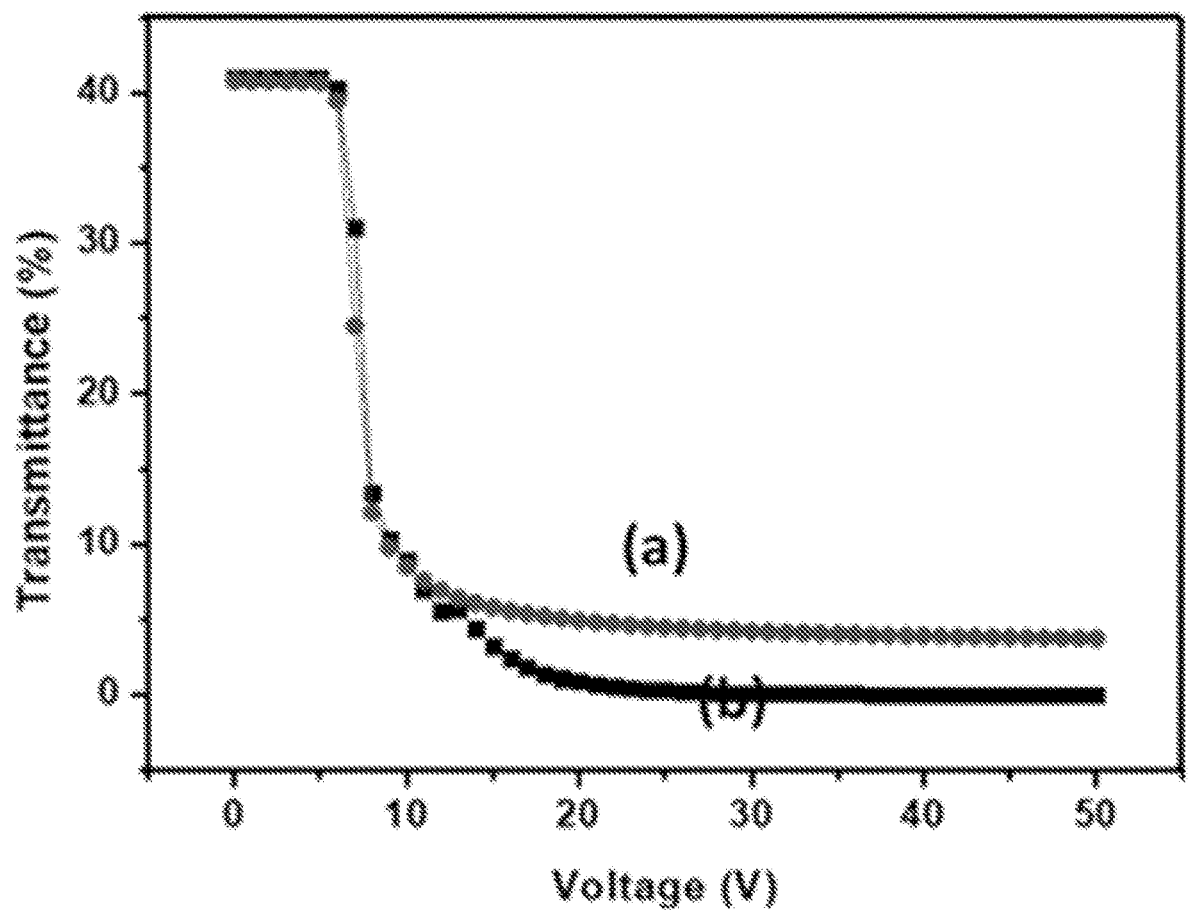
FIG. 6 is a graph showing transmittance of the double cell as a function of the applied voltage with light wavelength of 542 nm and two different frequencies: (a) 1 kHz and (b) 50 Hz.

The electro-optical response of the liquid crystal cell was measured. In the measurement a He—Ne green laser with wavelength of 542 nm was used. The light was unpolarized and was normally incident on the LC cell. The detector was a photo-diode with the collection angle of 4°. The result is shown in FIG. 6. In the voltage off state, the transmittance was 42%. When a voltage with 1 kHz frequency was applied, in one cell the liquid crystal was rotated to the x direction to absorb the component of the incident light polarized in the x direction; in the other cell liquid crystal was rotated to the y-direction to absorb the component of the incident light polarized in the y-direction. The unpolarized incident was absorbed more, as shown by curve (a) in FIG. 6. The minimum transmittance at 20 V became 3.8%. When the frequency of the applied voltage was changed to 50 Hz, the voltage dependence of the transmittance is shown by curve (b) in FIG. 6. The scattering of the double cell was also stronger than the single cell.

Figure 7:
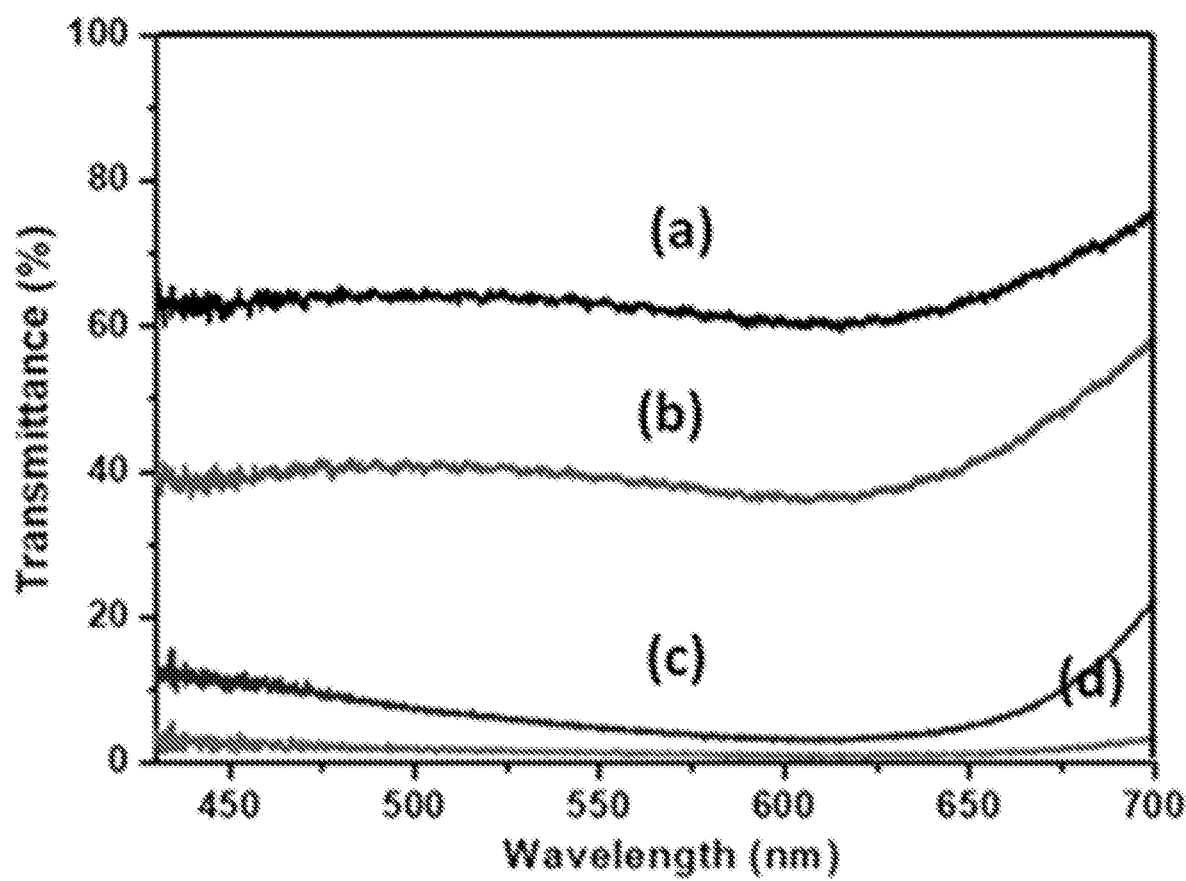
FIG. 7 is a graph showing transmission spectra of cells under various applied voltages: (a) a single cell at 0 V; (b) a double cell at 0 V; (c) a double cell at 20 V/1 kHz; and (d) a double cell at 40 V/50 Hz.

The transmission spectrum was measured in the visible light region of the liquid crystal cells under various applied voltages. The result is shown in FIG. 7. When no voltage was applied, the transmittances of the cells were high in the entire visible light region, as shown by curves (a) and (b). When the voltage 20 V/1 kHz was applied, the transmittances decreased significantly, as shown by curve (c), due to the absorption of the dye. The spectra had a small dependence on the wavelength due to the wavelength-dependence absorption of the dichroic dye. The absorption of the dye becomes weaker for light with wavelength longer than 650 nm. Above that wavelength, the transmittance increases with the wavelength as shown by curves (c) and (d). When the voltage of 40 V/50 Hz was applied, the transmittance became very low, as shown by curve (d). The scattering remained strong for light with wavelength longer than above 650 nm. Note when light was scattered, it was not absorbed but deflected away the original propagation direction.

Figure 8:
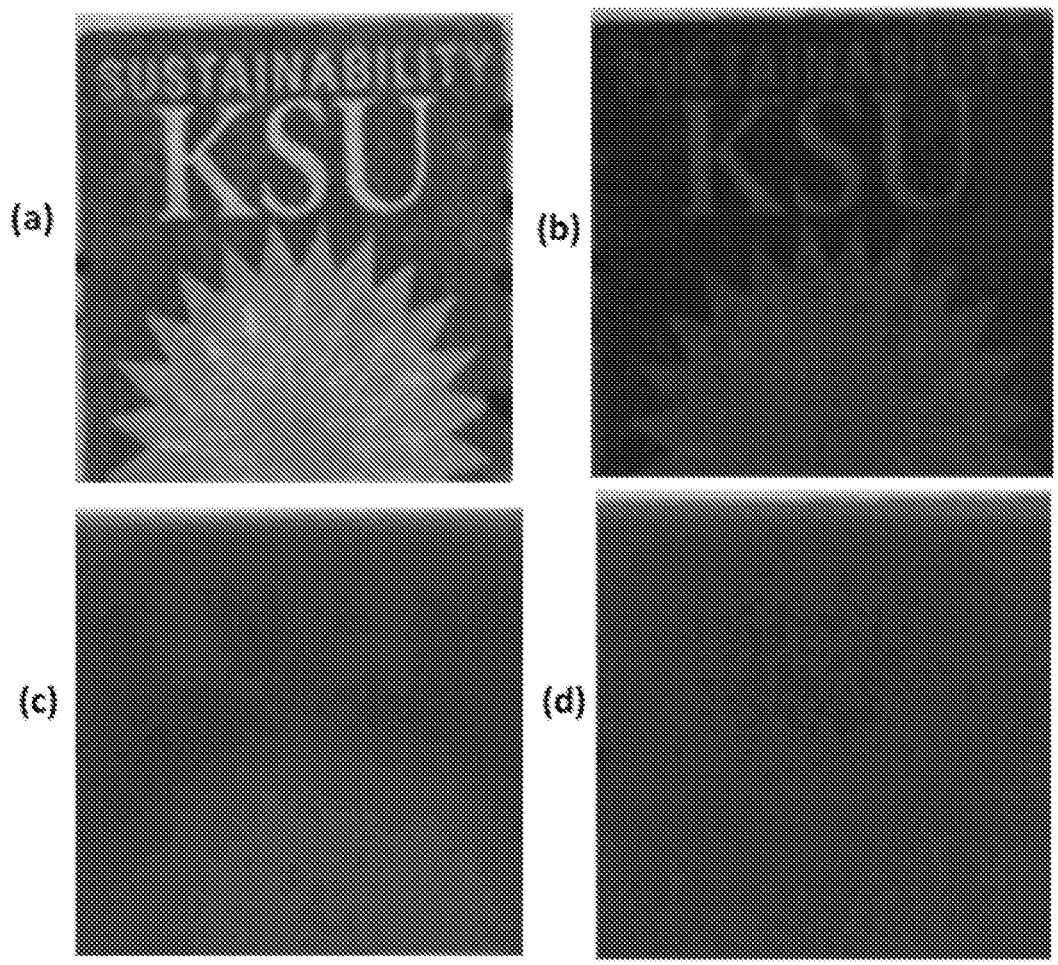
FIG. 8 contains photographs of the dual-mode double-cell liquid crystal switchable window under various applied voltages: (a) a single cell at 0 V; (b) a double cell at 0 V; (c) a double cell at 20 V/1 kHz; and (d) a double cell at 40 V/50 Hz.

The photographs of the (double cell) dual mode switchable window are shown in FIG. 8. A Kent State University logo was placed behind the window. The distance between the logo and the liquid crystal layer was about 5 mm. When no voltage was applied, the window was transparent with high transmittance and without haze, as shown by FIG. 8(a). The logo can be seen. When 20 V with the frequency of 1 kHz was applied, the transmittance of the window was decreased, but the haze remained low, as shown by FIG. 8(b). The image of logo is not distorted and thus can still be seen. When 20 V with the frequency of 50 Hz was applied, the window became opaque, as shown by FIG. 8(c). The image of the logo is frosted. When the voltage was increased to 40 V, the scattering was increased, and the logo cannot be seen, as shown by FIG. 8(d).

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The invention claimed is:

1. A dual-mode switchable liquid crystal window comprising a liquid crystal composition between a first transparent electrode and a second transparent electrode;
    wherein the liquid crystal composition comprises a liquid crystal mixture and a dichroic dye;
    wherein the liquid crystal composition has a slightly negative dielectric anisotropy; and
    wherein the liquid crystal composition has a large flexoelectric coefficient; and
    wherein the liquid crystal and doped dye molecules inside the window reorient uniformly under dielectric interactions when a high-frequency voltage is applied and/or the liquid crystal and doped dye molecules are switched into a micron-sized polydomain structure under flexoelectric interactions when a low-frequency voltage is applied.

2. The window of claim 1, wherein an amount of the dichroic dye is less than 5 wt %.

3. The window of claim 1, wherein an amount of the dichroic dye is less than 3 wt %.

4. The window of claim 1, wherein an amount of the dichroic dye is less than 2 wt %.

5. The window of claim 1, wherein an amount of the dichroic dye is about 1 wt % to about 2 wt %.

6. The window of claim 1, wherein the liquid crystal mixture comprises at least one nematic liquid crystal and at least one liquid crystal dimer.

7. The window of claim 1, wherein the window is transparent without haze in the absence of an applied voltage.

8. The window of claim 1, wherein the liquid crystal and doped dye molecules inside the window reorient uniformly under dielectric interactions when the high-frequency voltage is applied.

9. The window of claim 1, wherein the liquid crystal and doped dye molecules are switched into the micron-sized polydomain structure under flexoelectric interactions when the low-frequency voltage is applied.

10. A dual-mode switchable liquid crystal window comprising a liquid crystal composition between a first transparent electrode and a second transparent electrode;
    wherein the window is transparent without haze in the absence of an applied voltage;
    wherein the liquid crystal and doped dye molecules inside the window reorient uniformly under dielectric interactions when a high-frequency voltage is applied; and
    wherein the liquid crystal and doped dye molecules are switched into a micron-sized polydomain structure under flexoelectric interactions when a low-frequency voltage is applied.

11. The window of claim 10, wherein the liquid crystal composition comprises a liquid crystal mixture and a dichroic dye;
    wherein the liquid crystal composition has a slightly negative dielectric anisotropy; and
    wherein the liquid crystal composition has a large flexoelectric coefficient.

12. The window of claim 11, wherein an amount of the dichroic dye is about 1 wt % to about 2 wt %.

13. The window of claim 11, wherein the liquid crystal mixture comprises at least one nematic liquid crystal and at least one liquid crystal dimer.

14. A method for switching a window comprising:
    providing a liquid crystal cell comprising a liquid crystal composition disposed between a first transparent electrode and a second transparent electrode, wherein the window is transparent without haze in the absence of an applied voltage; and
    applying one of:
    a high-frequency voltage, wherein liquid crystal molecules and doped dye molecules inside the window reorient uniformly under dielectric interactions; and
    a low-frequency voltage, wherein liquid crystal molecules and doped dye molecules are switched into a micron-sized polydomain structure under flexoelectric interactions.

15. The method of claim 14, wherein the liquid crystal mixture comprises at least one nematic liquid crystal and at least one liquid crystal dimer.

16. The method of claim 14, wherein the high-frequency voltage is in the range of about 500 Hz to about 10 KHz.

17. The method of claim 14, wherein the low-frequency voltage is in the range of about 1 Hz to about 500 Hz.

18. The method of claim 14, wherein the liquid crystal composition has a dielectric anisotropy in the range of about −5 to −0.1.

19. The method of claim 14, wherein the liquid crystal composition has a flexoelectric coefficient having a magnitude in the range of about 1 pC/m to about 50 pC/m.

20. The dual-mode switchable liquid crystal window of claim 1,
    wherein the dielectric anisotropy in the range of about −5 to −0.1; and
    wherein the magnitude in the range of about 1 pC/m to about 50 pC/m.

* * * * *